United States Patent
Tipton

(10) Patent No.: US 9,474,250 B1
(45) Date of Patent: Oct. 25, 2016

(54) ANIMAL GROOMING TOOL WITH WAVE PATTERN BLADE TEETH

(71) Applicant: Jennifer L. Tipton, Billings, MT (US)

(72) Inventor: Jennifer L. Tipton, Billings, MT (US)

( * ) Notice: Subject to any disclaimer, the term of this patent is extended or adjusted under 35 U.S.C. 154(b) by 0 days.

(21) Appl. No.: 14/725,509

(22) Filed: May 29, 2015

(51) Int. Cl.
 *A01K 13/00* (2006.01)
 *A45D 24/30* (2006.01)

(52) U.S. Cl.
 CPC ........... *A01K 13/002* (2013.01); *A01K 13/001* (2013.01); *A45D 24/30* (2013.01)

(58) Field of Classification Search
 CPC ...... A45D 24/02; A45D 24/04; A45D 24/08; A45D 24/30; A01K 13/001; A01K 13/002
 USPC .......................... 119/625, 626, 631, 632, 633
 See application file for complete search history.

(56) References Cited

U.S. PATENT DOCUMENTS

| | | | | |
|---|---|---|---|---|
| 191,784 A * | 6/1877 | Sweet | ................... | A01K 13/002 119/631 |
| 194,820 A * | 9/1877 | Holmes | ................. | A01K 13/002 119/631 |
| 195,344 A * | 9/1877 | Clune | ................... | A01K 13/002 119/631 |
| 206,526 A * | 7/1878 | Beach | ................... | A01K 13/002 119/613 |
| 335,072 A * | 1/1886 | Howe | ................... | A01K 13/002 119/631 |
| 335,894 A * | 2/1886 | Clark | ................... | A01K 13/002 119/631 |
| 386,573 A * | 7/1888 | Blythe | .................... | B26B 19/24 119/617 |
| 431,490 A * | 7/1890 | Thomas | ............... | A01K 13/002 119/631 |
| 433,006 A * | 7/1890 | Kline | ................... | A01K 13/002 119/631 |
| 560,468 A * | 5/1896 | Burke | ................... | A01K 13/002 119/631 |
| 564,367 A * | 7/1896 | Eldridge | .............. | A01K 13/002 119/627 |
| 785,589 A * | 3/1905 | Brown | ................. | A01K 13/002 119/623 |
| 832,864 A * | 10/1906 | Lockwood | ........... | A01K 13/002 119/627 |
| 925,637 A * | 6/1909 | Hubbard | .............. | A01K 13/002 119/631 |
| 932,027 A * | 8/1909 | Kennedy | ................ | A45D 24/02 132/139 |
| 1,126,721 A * | 2/1915 | Decker | ................ | A01K 13/002 119/627 |
| 1,281,227 A * | 10/1918 | Sumitani | .................. | A45D 8/12 132/137 |
| 1,322,268 A * | 11/1919 | St. Clair | ................ | A45D 24/04 132/153 |
| 1,493,342 A * | 5/1924 | Haubert | ................. | A45D 24/02 132/141 |
| 2,139,709 A * | 12/1938 | Yaw | ....................... | A45D 24/02 132/141 |
| 2,246,746 A * | 6/1941 | McCoy | .................. | A45D 24/02 132/161 |
| RE21,985 E * | 12/1941 | McCoy | .................. | A45D 24/02 132/159 |

(Continued)

FOREIGN PATENT DOCUMENTS

| | | | | |
|---|---|---|---|---|
| DE | 811513 C | * | 8/1951 | ........... A01K 13/002 |
| DE | 839139 C | * | 5/1952 | ........... A01K 13/002 |

(Continued)

*Primary Examiner* — Stanton L Krycinski
(74) *Attorney, Agent, or Firm* — Edwin H. Crabtree; Ramon L. Pizarro

(57) ABSTRACT

A grooming tool used for removing hair, fur, dirt and dander from an animal. The too includes an oval shaped handle with an elongated blade slot along a length of the handle. An elongated "hacksaw" like blade is received in the blade slot and secured thereto. The blade includes small blade teeth 20 to 24 per inch along a length of the blade. The teeth have a "wave" like configuration for a more effective way of grooming the animal.

16 Claims, 2 Drawing Sheets

(56) References Cited

U.S. PATENT DOCUMENTS

| | | | | |
|---|---|---|---|---|
| 2,275,077 A * | 3/1942 | Higgins | A45D 24/02 | 132/161 |
| 2,497,209 A * | 2/1950 | Davitcho | A45D 24/04 | 132/142 |
| 2,589,469 A * | 3/1952 | Zerbo | A45D 24/02 | 132/125 |
| 2,636,498 A * | 4/1953 | Servilla | A45D 24/02 | 132/139 |
| 2,755,808 A * | 7/1956 | Golden | A45D 24/02 | 132/126 |
| 2,909,183 A * | 10/1959 | Golden | A45D 24/02 | 132/141 |
| 3,160,142 A * | 12/1964 | Torow | A01K 13/002 | 119/623 |
| 3,181,540 A * | 5/1965 | Abraham | A45D 24/02 | 132/159 |
| 4,198,928 A * | 4/1980 | Borba | A01K 13/002 | 119/631 |
| 4,917,129 A * | 4/1990 | Olson | A45D 24/02 | 132/150 |
| 5,618,289 A * | 4/1997 | Aragona | A01K 13/002 | 15/105 |
| 5,636,646 A * | 6/1997 | Zito | A45D 24/30 | 132/149 |
| 5,873,374 A * | 2/1999 | Sanz | A45D 24/30 | 132/125 |
| 6,079,421 A * | 6/2000 | Tafoya | A45D 24/36 | 132/213 |
| 6,082,307 A * | 7/2000 | Landreneau | A01K 13/002 | 119/616 |
| 6,158,443 A * | 12/2000 | Leman | A45D 24/10 | 132/102 |
| 7,044,138 B2 * | 5/2006 | Brown | A45D 19/0008 | 132/139 |
| 7,234,472 B2 * | 6/2007 | Ramet | A45D 24/02 | 132/139 |
| 7,909,042 B2 * | 3/2011 | Bachrach | A45D 24/02 | 132/159 |
| 8,925,560 B2 * | 1/2015 | Heiberg | A45D 24/02 | 132/160 |
| 2005/0241661 A1 * | 11/2005 | Eddinger | A45D 24/04 | 132/139 |
| 2006/0243293 A1 * | 11/2006 | Lanne | A45D 24/30 | 132/163 |
| 2012/0037176 A1 * | 2/2012 | Ito | A45D 24/02 | 132/200 |
| 2013/0098307 A1 * | 4/2013 | Offhaus | A01K 13/003 | 119/664 |
| 2013/0343041 A1 * | 12/2013 | Renforth | A01K 13/002 | 362/109 |
| 2015/0047576 A1 * | 2/2015 | Dauphin | A01K 13/002 | 119/633 |

FOREIGN PATENT DOCUMENTS

| | | | | |
|---|---|---|---|---|
| FR | 677741 A | * | 3/1930 | A45D 24/04 |
| FR | 767780 A | * | 7/1934 | A45D 2/42 |
| FR | 952779 A | * | 11/1949 | A45D 24/04 |
| FR | 1043721 A | * | 11/1953 | A45D 24/02 |
| GB | 604963 A | * | 7/1948 | A45D 24/02 |

* cited by examiner

ANIMAL GROOMING TOOL WITH WAVE PATTERN BLADE TEETH

BACKGROUND OF THE INVENTION (a) Field of the Invention

This invention relates to a grooming tool and more particularly, but not by way of limitation, to an animal grooming tool having a blade with blade teeth for removing hair, fur, dirt and dander from a horse, a pet and other animals.

(b) Discussion of Prior Art

Heretofore, the have been any number of different types of grooming tools used with various types of animals. None of these grooming tools provide the unique structure, function and advantages of the subject invention as described herein.

SUMMARY OF THE INVENTION

In view of the foregoing, it is a primary objective of the subject invention to provide a grooming tool handle with a blade having blade teeth formed in a wave pattern. The wave pattern creates a more efficient and effective way of grooming an animal as the blade teeth glide, in an undulating manner, through the coat of the animal, thus removing hair, fur, dander and the like.

Another object of the invention is the handle with blade and blade teeth can come in various lengths and sizes for grooming different size animals.

Still another object of the grooming tool is it can be used for cleaning hair and fur from furniture, bedding, saddle blankets and other items coming into contact with a shedding animal.

The tool includes an oval shaped handle with an elongated blade slot along the length of the handle. The blade slot is used to receive a portion of a "hacksaw" like blade therein. The blade includes small blade teeth. The teeth have a "wave" like configuration for a more effective manner of grooming of an animal.

These and other objects of the present invention will become apparent to those familiar with various types of grooming tools used with animals when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the subject grooming tool, and in which.

DESCRIPTION OF THE PREFERRED EMBODIMENTS

Figure 1:
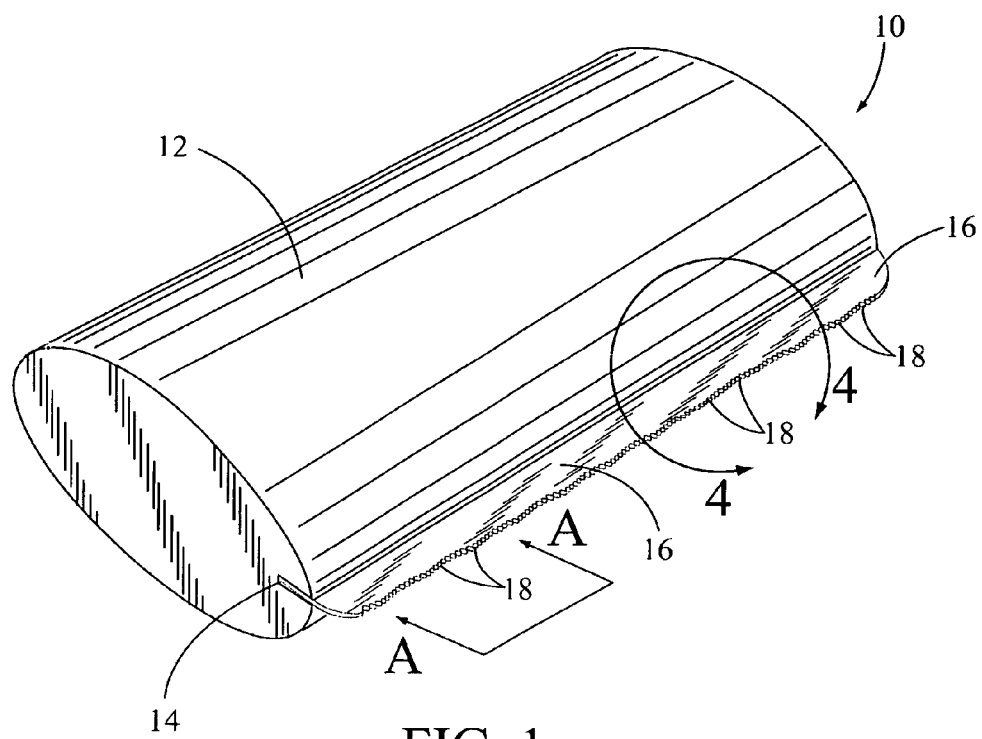
FIG. 1 illustrates a perspective view of the subject grooming tool with a handle, an elongated blade mounted along a length of the handle, and blade teeth formed in a wave pattern.
Figure 4:
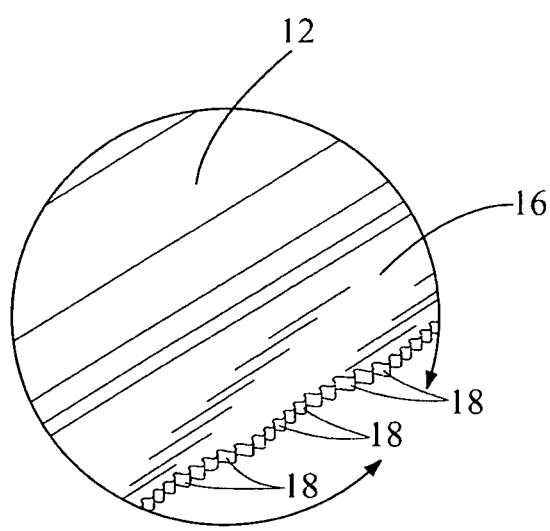
FIG. 4 is a perspective view of an enlarged portion of the blade shown in FIG. 1. In this view, the small cutting teeth of the blade are shown undulating back and forth along the length of the blade, thus form a wave action when grooming a coat of an animal.
Figure 5:
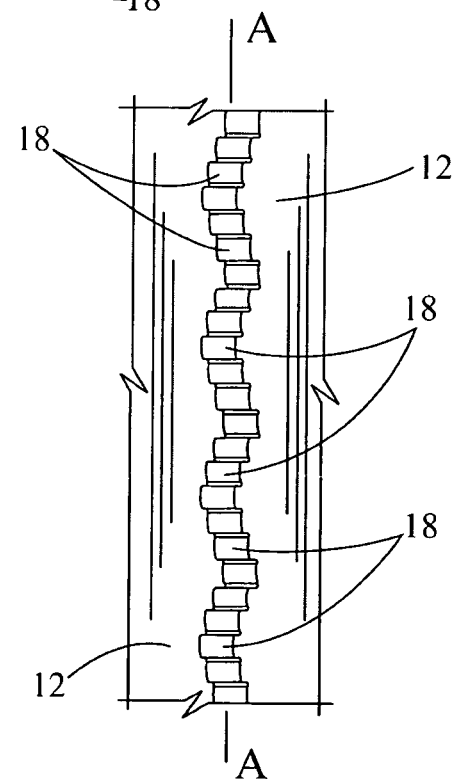
FIG. 5 is a greatly enlarged top view of the cutting teeth of the blade and illustrating the wave pattern of the teeth.

In FIG. 1, a perspective view of the subject grooming tool is shown having a general reference numeral 10. The tool 10 includes an oval shaped handle 12, which can have a length in a range of 6 to 12 inches or longer for grooming large animals. The handle can be made of wood, plastic and similar materials. The handle 12 includes an elongated slot 14 along a length of the handle 12 for receiving a portion of a metal "hacksaw" like blade 16 with small cutting teeth 18. The teeth 18 are formed along a length of the blade in a unique wave pattern as shown in FIGS. 4 and 5. A length of the small teeth 18 are typically less than $\frac{1}{16}$ of an inch. Also, there are typically 20 to 24 teeth per inch along the length of the blade. Further, the wave pattern is designed for approximately 10 to 12 teeth per ½ inch to move forward and then 10 to 12 teeth per ½ inch to move backward in the undulating manner.

Figure 2:
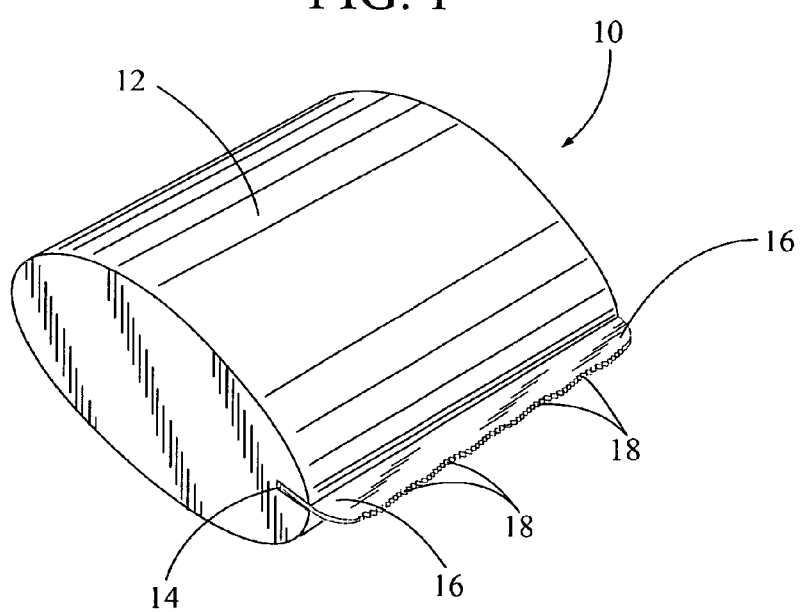
FIG. 2 illustrates another perspective view of the grooming tool similar to what is shown in FIG. 1, but with a shorter handle and blade for grooming smaller animals.

In FIG. 2, another perspective view of the grooming tool 10 is illustrated and similar to the tool shown in FIG. 1. In this drawing, the tool 10 has a length in a range of 2 to 6 inches for grooming smaller animals.

Figure 3:
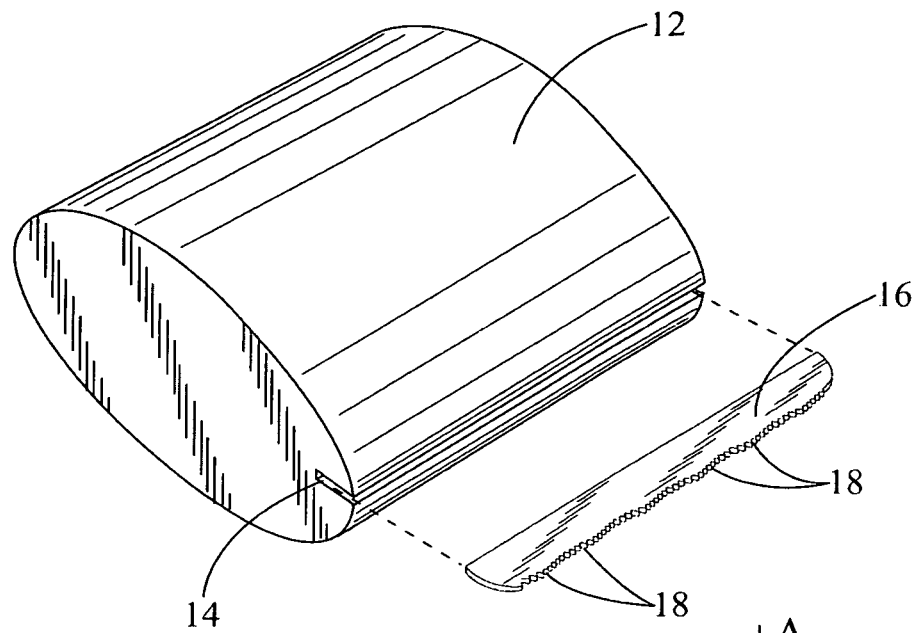
FIG. 3 is similar to FIG. 2 and illustrates the blade with blade teeth positioned for being inserted into a blade slot along a length of the handle.

In FIG. 3, the tool 10 is illustrated with the blade 16 with blade teeth 18 positioned for being inserted into the blade slot 14 along a length of the handle 12 and glued therein.

In FIG. 4, a perspective view of an enlarged portion of the blade 16, as shown in FIG. 1, is illustrated. In this view, the small cutting teeth 18 of the blade 16 are shown undulating backward and forward along the length of the blade when looking down on top of the blade, thus forming a wave action when the tool 10 is used to groom a coat of an animal.

In FIG. 5, a greatly enlarged top view of the cutting teeth 18 is illustrated along a center line A-A. This drawing illustrates only a portion of the handle 12 and the teeth 18. By trial and error, it has been found that the motion of the wave pattern on the teeth 18 glides the tool 10 back and forth in the coat of the animal for a more effective and efficient way of removing shedding hair and fur, dirt and dander and the like, when compared to a less effective grooming tool merely having blade teeth, linear in position, along a length of the tool blade.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which an exclusive privilege and property right is claimed are defined as follows:

1. A grooming tool used for removing hair, fur, dirt and dander from an animal, the tool comprising:
    a handle with an elongated blade slot along a length of the handle;
    a blade, a portion of the blade received in the blade slot and secured thereto; and blade teeth formed along a length of the blade, the blade teeth having a same length, the blade teeth undulating forward and backward along the length of the blade to form a wave configuration such that along the length of the blade a first plurality of the blade teeth progressively decrease in distance from the blade slot from a first crest to a first trough of the wave configuration followed by a second plurality of the blade teeth progressively increasing in distance from the blade slot to a second crest of the wave configuration followed by a third plurality of the blade teeth progressively decreasing in distance from the blade slot to a second trough of the wave configuration for a more effective way of grooming the animal.

2. The grooming tool as described in claim 1 wherein the first plurality of blade teeth are along ½ inch of the length of the blade, and the second plurality of blade teeth are along ½ inch of the length of the blade.

3. The grooming tool as described in claim 1 wherein the handle has a length in a range of 6 to 12 inches for grooming large animals.

4. The grooming tool as described in claim 1 wherein the handle has a length on a range of 2 to 6 inches for grooming small animals.

5. The grooming tool as described in claim 1 wherein the teeth have a length of 1/16 of an inch and less.

6. A grooming tool used for removing hair, fur, dirt and dander from an animal, the tool comprising:
- a handle with an elongated blade slot along a length of the handle;
- a blade, a portion of the blade received in the blade slot and secured thereto; and
- blade teeth formed along a length of the blade, the blade having 20 to 24 blade teeth per inch along the length of the blade, the blade teeth having a same length, the blade teeth undulating forward and backward along the length of the blade to form a wave configuration such that along the length of the blade a first plurality of the blade teeth progressively decrease in distance from the blade slot from a first crest to a first trough of the wave configuration followed by a second plurality of the blade teeth progressively increasing in distance from the blade slot to a second crest of the wave configuration followed by a third plurality of the blade teeth progressively decreasing in distance from the blade slot to a second trough of the wave configuration for a more effective way of grooming the animal.

7. The grooming tool as described in claim 6 wherein the first plurality of blade teeth are along ½ inch of the length of the blade, and the second plurality of blade teeth are along ½ inch of the length of the blade.

8. The grooming tool as described in claim 6 wherein the handle has a length in a range of 6 to 12 inches for grooming large animals.

9. The grooming tool as described in claim 6 wherein the handle has a length on a range of 2 to 6 inches for grooming small animals.

10. The grooming tool as described in claim 6 wherein the teeth have a length of 1/16 of an inch and less.

11. A grooming tool used for removing hair, fur, dirt and dander from an animal, the tool comprising:
- a handle made of wood or plastic, the handle having an elongated blade slot along a length of the handle;
- a blade, a portion of the blade received in the blade slot and secured thereto; and
- blade teeth formed along a length of the blade, the blade teeth having a same length, the blade teeth undulating forward and backward along the length of the blade to form a wave configuration such that along the length of the blade a first plurality of the blade teeth progressively decrease in distance from the blade slot from a first crest to a first trough of the wave configuration followed by a second plurality of the blade teeth progressively increasing in distance from the blade slot to a second crest of the wave configuration followed by a third plurality of the blade teeth progressively decreasing in distance from the blade slot to a second trough of the wave configuration for a more effective way of grooming the animal.

12. The grooming tool as described in claim 11 wherein the first plurality of blade teeth are along ½ inch of the length of the blade, and the second plurality of blade teeth are along ½ inch of the length of the blade.

13. The grooming tool as described in claim 10 wherein the handle has a length in a range of 6 to 12 inches for grooming large animals.

14. The grooming tool as described in claim 10 wherein the handle has a length on a range of 2 to 6 inches for grooming small animals.

15. The grooming tool as described in claim 10 wherein the tool has 20 to 24 teeth per inch along the length of the blade.

16. The grooming tool as described in claim 10 wherein the teeth have a length of 1/16 of an inch and less.

* * * * *